United States Patent
Wesly et al.

(10) Patent No.: US 7,558,756 B1
(45) Date of Patent: Jul. 7, 2009

(54) METHOD AND SYSTEM FOR EVALUATING LOAN WORKOUT SCENARIOS

(75) Inventors: Lois Wesly, Washington, DC (US); Susan H. Staley, Decatur, GA (US); Sylvia A. Ramos, Gaithersburg, MD (US)

(73) Assignee: Fannie Mae, Washington, DC (US)

( * ) Notice: Subject to any disclaimer, the term of this patent is extended or adjusted under 35 U.S.C. 154(b) by 1054 days.

(21) Appl. No.: 10/324,089

(22) Filed: Dec. 20, 2002

Related U.S. Application Data

(60) Provisional application No. 60/343,912, filed on Dec. 28, 2001.

(51) Int. Cl.
*G06Q 40/00* (2006.01)

(52) U.S. Cl. .......................................... 705/38; 705/35

(58) Field of Classification Search ............. 705/38–40; 708/131–132, 134; 434/107, 109, 433
See application file for complete search history.

(56) References Cited

U.S. PATENT DOCUMENTS

| | | | |
|---|---|---|---|
| 5,930,775 A | 7/1999 | McCauley et al. | |
| 6,067,533 A | 5/2000 | McCauley et al. | |
| 2001/0044773 A1* | 11/2001 | Sellers et al. | 705/38 |
| 2002/0188494 A1* | 12/2002 | Budnik et al. | 705/9 |
| 2003/0120586 A1* | 6/2003 | Litty | 705/38 |

OTHER PUBLICATIONS

Inbae Kim, A simultaneous analysis of the risk premia in the markets for foreign exchange and stock, Theis, The University of North Carolina at Chapel Hill (pp. 1-2, abstract).*
Everett S. Covington's article "Workout Group", Mortgage Banking, Dec. 1988.*

* cited by examiner

*Primary Examiner*—James P Trammell
*Assistant Examiner*—Brian Fertig
(74) *Attorney, Agent, or Firm*—Rader Fishman & Grauer PLLC

(57) ABSTRACT

A computer system for evaluating multiple loan workout options. Each loan workout option includes at least one scenario. The computer system includes a collection component and a processing component. The collection component collects information relating to a loan from a plurality of internal and external sources. The processing component evaluates the workout options based on the information relating to the loan. The processing component also uses predetermined values obtained from evaluations of empirical data and predefined rules associated the scenario to access risks associated with each of the workout options and to provide at least one recommendation for each workout option to a user.

18 Claims, 3 Drawing Sheets

METHOD AND SYSTEM FOR EVALUATING LOAN WORKOUT SCENARIOS

This application claims the benefit of U.S. Provisional Application No. 60/343,912, filed on Dec. 28, 2001, and incorporated by reference.

FIELD OF THE INVENTION

The present invention relates to a system and method for evaluating loan workout options based on a risk factor.

BACKGROUND OF THE INVENTION

An accurate estimate about the degree of default associated with delinquent loans can be important to many different entities that participate in mortgage loans origination, holding, and servicing. For example, accurate estimates serve the interests of financial institutions that buy and sell mortgages and loan servicers that service mortgages during contractual terms. Prior to obtaining a mortgage loan to purchase a property, each borrower must meet certain standards that are established by the financial institution lending the mortgage loan. Thereafter, each borrower that meets those standards typically receives the mortgage loan to purchase the property in exchange for contractual obligations, such as obligations to repay the loan, on a timely basis, with interest, and within a predefined time period.

During the term of each mortgage loan, a loan servicer ensures that the mortgage loan is repaid per the contractual terms in exchange for a servicing fee from the holder of the mortgage loan. However, any number of situations may cause the borrower to become delinquent during the repayment term. If the borrower's delinquency lasts for a predefined period, for example three months, the loan servicer's ultimate remedy is foreclosure, wherein the borrower's credit history is damaged, the borrower loses the property, the holder of the mortgage loses the future interest income, and the loan servicer incurs expenses in the disposal of the property. Moreover, the holder of the loan is typically unable to recover the entire amount of the loan from the foreclosure sale.

Since all parties, i.e., the borrower, the holder of the mortgage loan and loan servicer typically want to avoid foreclosure, holders of mortgage loans have developed loan workout options as alternatives to foreclosure. The loan workout options enable delinquent borrowers to repay the loan based on revised terms, thereby benefiting both the borrower and the parties holding and servicing the mortgage loan. Current workout options include a repayment plan option, a loan modification option, a pre-foreclosure sale option, an assumption of mortgage option, and a deed in lieu of foreclosure option. The repayment plan option defines a schedule of how the borrower will repay all of the delinquent funds within a predetermined time. The loan modification option enables the loan servicer to modify the original terms of the loan. The pre-foreclosure sale option allows the borrower to sell the property, for less than the amount owed to the holder of the mortgage in satisfaction of the entire debt, before foreclosure proceedings are commenced. The assumption of mortgage option enables the borrower to transfer the liability of the mortgage loan contract to a new buyer of the property and the original borrower is typically released from the contractual terms. The deed in lieu of foreclosure option allows the property deed to be transferred to the holder of the mortgage in exchange for cancellation of the mortgage debt. In order to determine the best workout option for each borrower, a system is needed to evaluate various workout options and identify those options that are best suited to each borrower.

SUMMARY OF THE INVENTION

The present invention relates to a computer system for evaluating multiple loan workout options. Each loan workout option includes at least one scenario. The computer system includes a collection component and a processing component. The collection component collects information relating to a loan from a plurality of internal and external sources. The processing component evaluates the workout options based on the information relating to the loan. The processing component also uses predetermined values obtained from evaluations of empirical data and predefined rules associated with the scenario to assess risks associated with each of the workout options and to provide at least one recommendation for each workout option to a user.

Specifically in a preferred embodiment of the invention, a user inputs a loan identifier into loan a workout system. The collection component uses the loan identification information to retrieve information relating to the loan. The processing component identifies predefined values for each of the workout options based on empirical analysis of mortgage related data and uses the predefined values, predefined rules associated with each workout option and the information relating to the loan to evaluate at least one scenario associated with each of the workout options. The processing component then generates a recommendation for each of the plurality of workout options and presents the recommendation for each of the workout options to the user.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings. The present invention described below extends the functionality of the inventive system and method for evaluating loan workout scenarios based on a risk factor.

Figure 1:
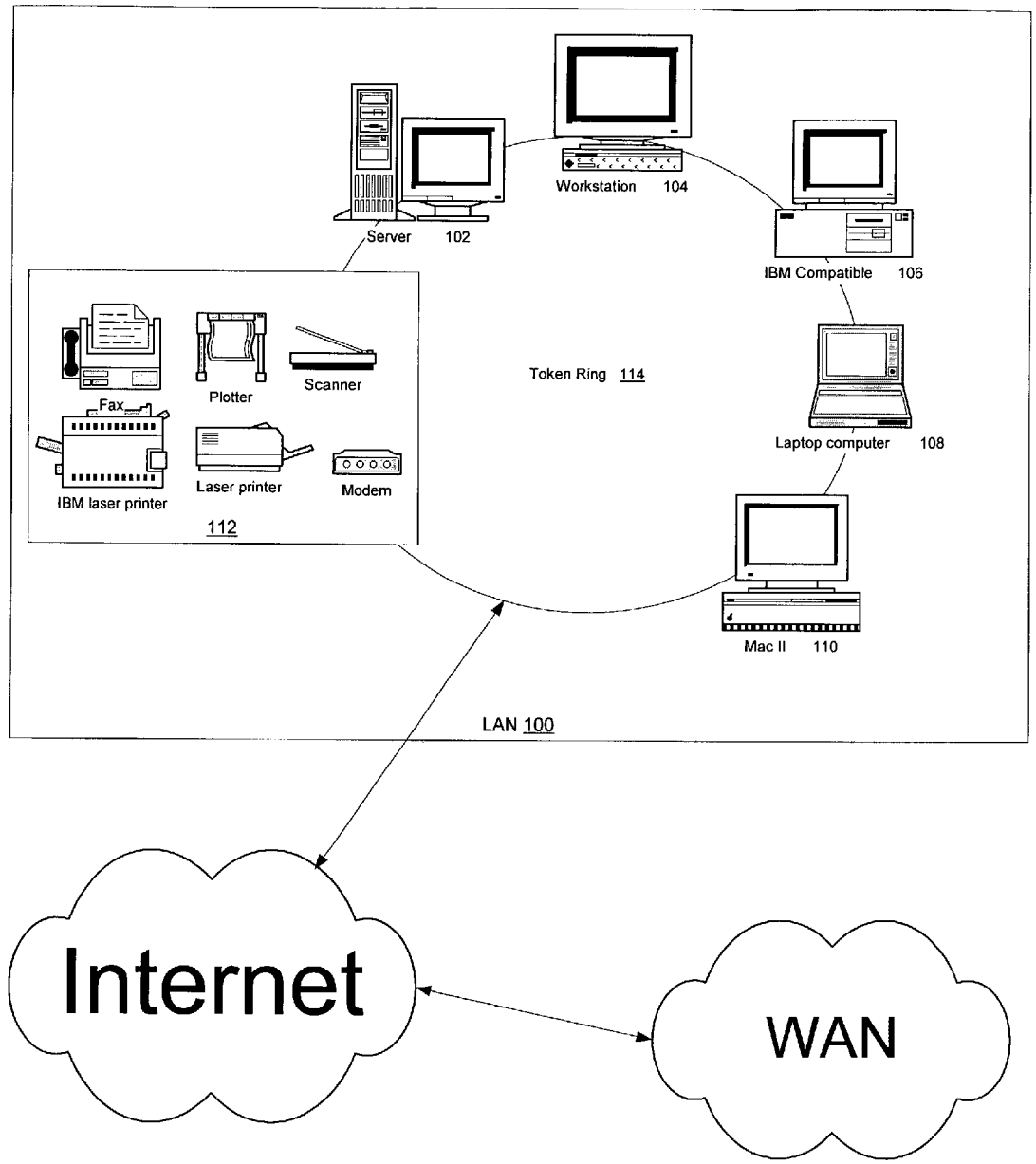
FIG. 1 illustrates a local area network (LAN) that is configured to access, analyze, and present risk information associated with a corporation.

FIG. 1 illustrates a local area network (LAN) 100 that is configured to evaluate various scenarios that are associated with loan workout options. LAN 100 comprises a server 102, four computer systems 104-110, and peripherals, such as printers and other devices 112, that may be shared by components on LAN 100. Computer systems 104-110 may serve as clients for server 102 and/or as clients and/or servers for each other and/or for other components connected to LAN 100. Components on LAN 100 are preferably connected together by cable media, for example copper or fiber-optic cable, and the network topology may be a token ring topology 114. It should be apparent to those of ordinary skill in the art that other media, for example wireless media, such as optical and radio frequency, may also connect LAN 100 components. It should also be apparent that other network topologies, such as Ethernet, may be used.

According to the invention, LAN 100 is connected to the Internet and may be connected to other LANs or Wide Area Networks (WAN). Hence some components of LAN 100 are preferably Web-enabled. The computer processor for executing the inventive system and method, for example server 102 and/or computer systems 104-110, include electronic storage media, such as disks, for storing programming code and data structures used to implement the inventive method and outputs therefrom. The invention uses a computer system, for example computer system 104, to implement an inventive application for gathering detailed financial information from non-depository institutions and calculating risk exposure from the financial information. Note that any computer system may be configured to implement the inventive method and computer system 104 is only used for exemplary purposes.

Figure 2:
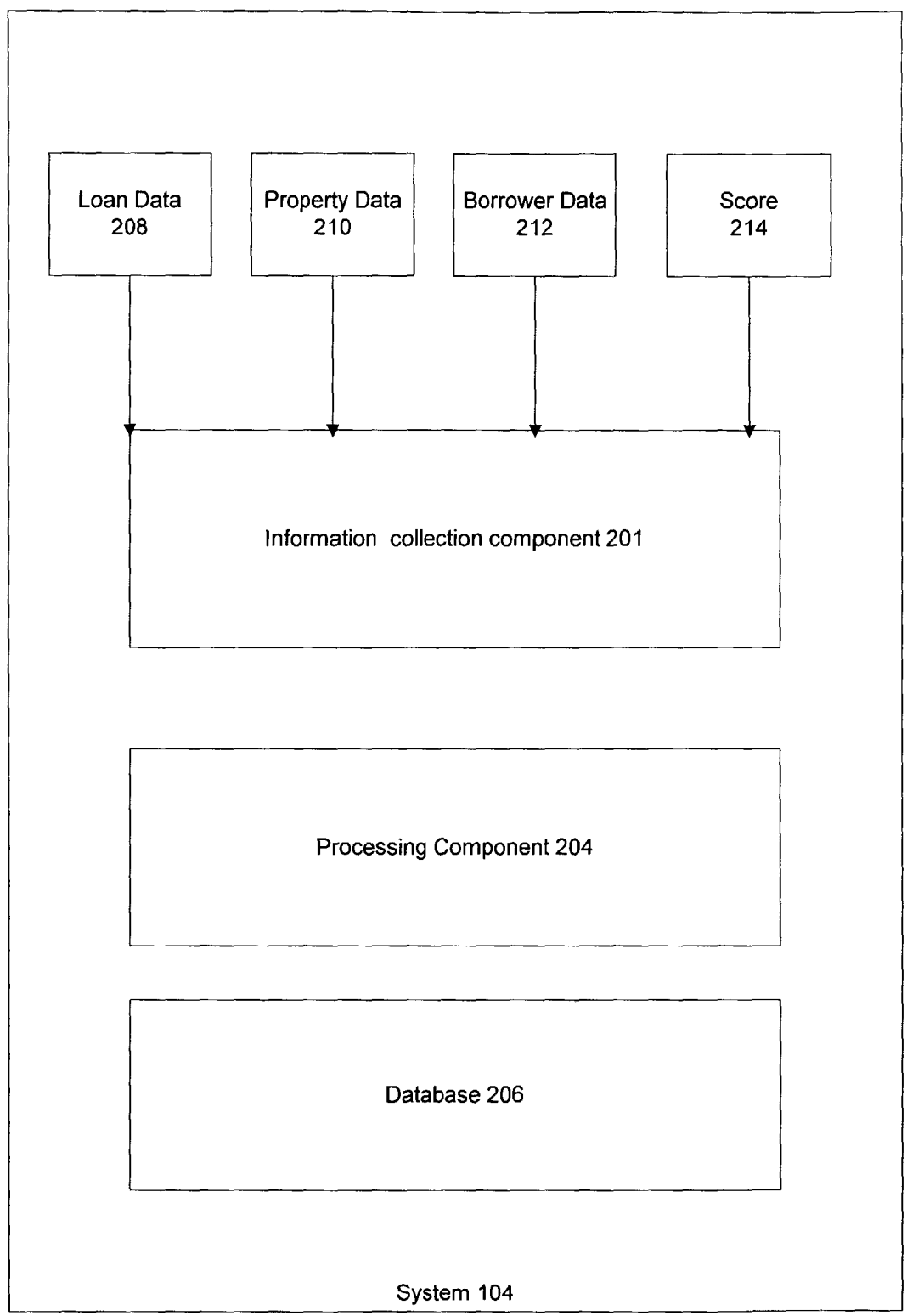
FIG. 2 illustrates components used a in computer system, that facilitate in evaluating workout options and scenarios based on risk profile.

FIG. 2 illustrates components used in computer system 104 that facilitate in evaluating workout options and scenarios based on risk profile. Computer system 104 includes an information collection component 201, a processing component 204, and a database 206. Information collection component 201 includes a user interface for enabling users to enter information into the computer system 104. Information collection component 201 also may include modules for obtaining information about the loan, such as an estimated value of the property and the borrower's risk profile, from multiple databases that may be proprietary to a lender or a third party entity with loan related data. Processing component 204 evaluates multiple loan workout options and scenarios and provides an assessment of the desirability of various workout scenarios based on an analysis of the borrower information, the lender information and risk information. The assessment is based at least in part on evaluations of empirical data that have helped in identifying and determining threshold values for evaluating risks associated with different workout scenarios. After accessing each scenario, processing component 204 provides a recommendation for the workout scenario. Database 206 stores loan related data and program code for processing retrieved loan-related data. Database 206 preferably stores in the program code threshold values for assessing the desirability of the various loan workout options or scenarios.

In a preferred embodiment of the invention, system 104 uses loan data 208, property data 210, borrower data 212 and a score 214 to evaluate workout options. Loan data 208 may include the interest rate of the loan, the term of the loan, the remaining unpaid balance, the delinquent balance, the loan payment history, the loan-to-value ratio and other relevant loan information. Loan data 208 is preferably automatically obtained directly from database 206 through the use of a unique loan or borrower identification number. As is apparent, loan data 208 also may be obtained from the borrower, from examination of the original loan documents, or from other sources.

Property data 210 may include the estimated resale value of the property, the presence of additional liens on the property, regional price trend data, and other information regarding the property. Property data 210 also may come from a variety of sources including the borrower, real estate information brokers, and title searching agencies.

Borrower data 212 may include the borrower's net income after expenses and loan workout option preferences.

Score 214 is a number quantifying a risk factor, such as a borrower's probability of default. Score 214 is preferably obtained from a scoring engine that is developed through statistical analysis of loan data. The scoring engine preferably inputs information, such as the borrower's payment/delinquency history, regional economic data, macroeconomic data indicating trends in the property value, market-to-market variables for a particular property value, individual property sales information over time, and market-to-market loan to value ("LTV"). The data inputted in the scoring engine may be obtained from multiple sources, such as a loan servicer, credit reporting agencies, mortgage databases, or other information sources. Upon evaluating the inputted information, the scoring engine outputs a probability of default value. In a preferred embodiment, the probability of default value is expressed as a percentage and multiplied by 1000 to generate score 214. Accordingly, score 214 can range from 0 to 999, with higher scores indicating a higher risk of default.

According to the invention, a user, e.g., the loan servicer, inputs a loan reference number or other form of loan identification into loan workout computer system 104. Information collection component 201 uses the loan identification information to retrieve information about the borrower's loan and property from databases 206 and various sources. The user may also be prompted to input, through information collection component 201, additional information that is used to analyze the data against various scenarios in each loan workout option. After all the input information is entered into system 104, processing component 204 evaluates each workout option separately. Processing component 204 identifies breakpoints and thresholds for each workout option based on empirical analysis of mortgage related data, including historical data on mortgage defaults and foreclosures. The breakpoints and threshold may vary as economic changes occur and new data is analyzed. Processing component 204 then provides an assessment and classification for each workout scenario, wherein each workout scenario is classified as "recommended," "proceed with caution," "not recommended" or "not applicable." After processing component 204 analyzes loan workout options, recommendations from processing component 204 are presented to the user.

Specifically, during evaluation of each workout option, processing component 204 evaluates a repayment plan option, a loan modification option, a pre-foreclosure sale option, assumption of mortgage option, and a deed in lieu of foreclosure option using a decision tree. During evaluation of the repayment plan option, processing component 204 produces four different repayment scenarios, wherein the borrower repays all of the delinquent funds within a specified term by making larger than normal monthly payments. For example, processing component 204 generates scenarios that allow the borrower to pay double the normal payment, to pay the original payment plus an additional three-quarters of the original payment, to pay the original payment plus an additional half of the original payment, or to pay the original payment plus an additional quarter of the original payment.

Processing component 204 determines the net income after expenses for each scenario and thereafter analyzes each scenario. In a preferred embodiment, processing component then uses predefined rules to implement a decision tree evaluation. The decision tree evaluation enables processing component 204 to determine whether or not to recommend the repayment plan option. Examples of rules used in the decision tree evaluation include rules for determining if the total delinquent amount cannot be repaid within a predefined time, for example 18 months, under any of the scenarios; if the borrower's net income after expenses is not above a first predefined amount, for example one hundred dollars, under any of the scenarios; if the borrower's net income after expenses is above the first predefined amount but less than a second predefined amount, for example one hundred and seventy five dollars, and the score associated with the loan is higher than a predefined threshold under any of the scenarios. If any of the above mentioned rules are true, then the repayment play option is not recommended. If, however, the borrower's net income after expenses is above the first predefined amount and less than the second predefined amount but the score associated with the loan is less than a predefined threshold under any of the scenarios, then the repayment play option is recommended as "proceed with caution." If the borrower's net income after expenses is above the second predefined amount, then processing component 204 recommends the repayment play option.

During evaluation of the loan modification option, processing component 204 changes the terms of the loan and the delinquent finds are capitalized over the remaining life of the loan, thereby changing the unpaid balance and monthly payment. Processing component 204 calculates a new unpaid balance that includes the delinquent funds and executes a decision tree evaluation with predefined rules. For example, if the note rate and the borrower's net income after expenses is greater than predefined thresholds then the loan modification option is recommended by processing component 204.

During evaluation of the pre-foreclosure sale option, processing component calculates the estimated value of a property, the total debt of the loan, and the net proceeds. Processing component 204 then performs a decision tree evaluation using predefined rules. For example, if the net proceeds is greater than the total debt, the pre-foreclosure sale option is not recommended; if the net proceeds is equal to or greater than a predefined percentage of the total debt but less than the total debt than the pre-foreclosure sale option is recommended.

During evaluation of the deed in lieu of foreclosure option, processing component calculates the estimated value of a property, the total debt of the loan, the real estate owned (REO) debt, and the total savings. Processing component 204 then performs a decision tree evaluation using predefined rules. For example, if the net proceeds is greater than the total debt, this option is not recommended. As is apparent to one skilled in to art, other workout options may be evaluated in computer system 104 and are considered within the scope of the present invention.

Figure 3:
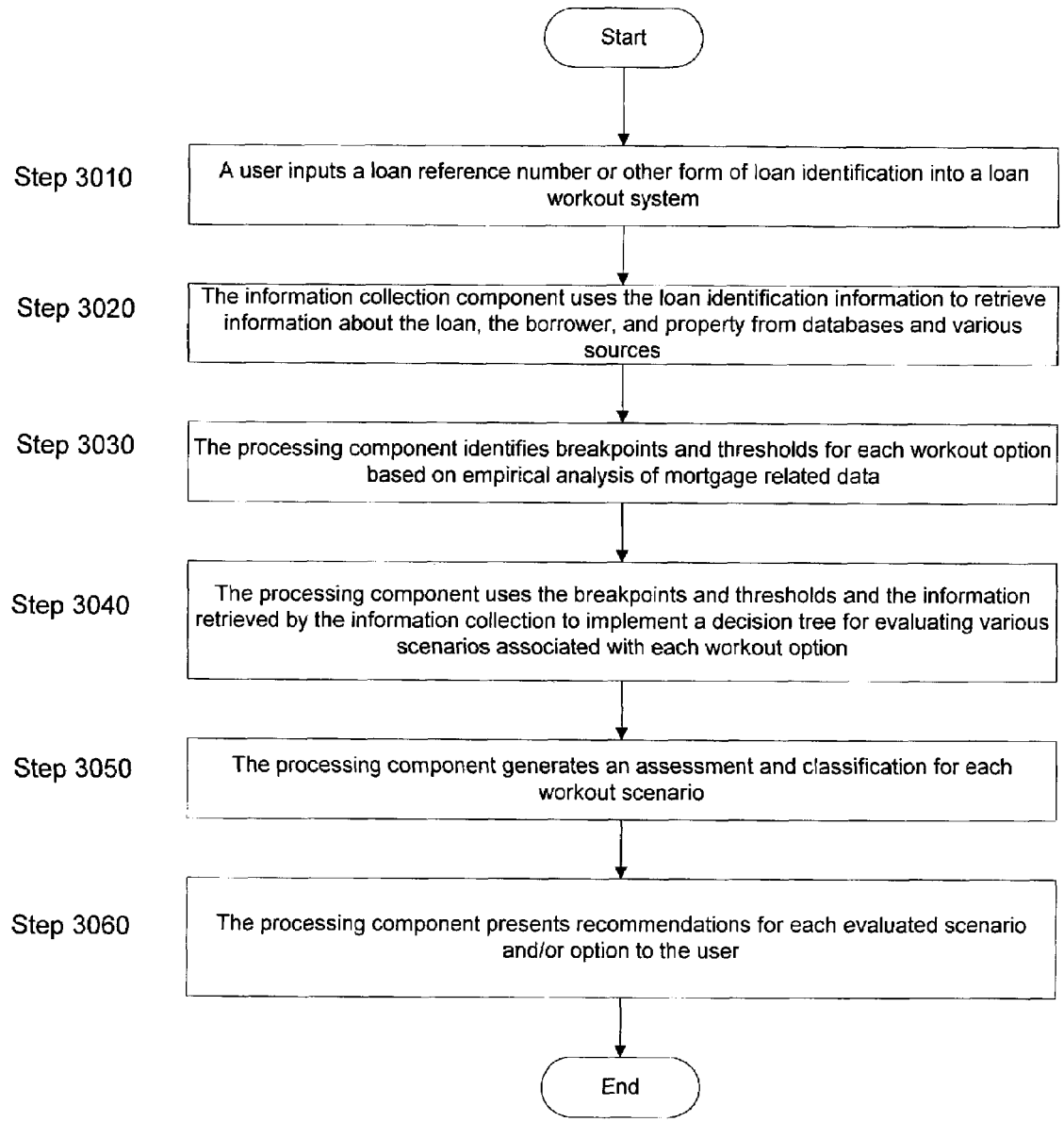
FIG. 3 illustrates the steps implemented in applying the inventive system.

FIG. 3 illustrates the steps implemented in the inventive system for evaluating loan workout scenarios. In Step 3010, a user inputs a loan reference number or other form of loan identification into loan workout system 104. In Step 3020, information collection component 201 uses the loan identification information to retrieve information about the loan, the borrower, and property from databases 206 and various sources. In Step 3030, processing component 204 identifies breakpoints and thresholds for each workout option based on empirical analysis of mortgage related data. In Step 3040, processing component 204 uses the breakpoints and thresholds and the information retrieved by information collection 201 to implement a decision tree for evaluating various scenarios associated with each workout option. In Step 3050, processing component 204 generates an assessment and classification for each workout scenario. In Step 3060, processing component 204 presents recommendations for each evaluated scenario and/or option to the user.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer system for evaluating a plurality of loan workout options, wherein at least one workout option includes a plurality of scenarios, the system comprising:
   a memory storing a collection component for collecting information relating to a loan from a plurality of internal and external sources; and
   a processor which executes instructions for evaluating the plurality of workout options based on the information relating to the loan, predetermined values obtained from evaluations of empirical data, and predefined rules associated with each of the plurality of scenarios to assess the risks associated with each of the plurality of workout options and to provide at least one recommendation for each workout option to a user;
   wherein:
   the workout options include a repayment plan option, a loan modification option, a pre-foreclosure sale option, an assumption of mortgage option, and a deed in lieu of foreclosure option;
   for the repayment plan option the system produces four different repayment scenarios, wherein the borrower repays all the delinquent funds within a specified term by making larger than normal monthly payments;
   for the loan modification plan option the system produces a repayment scenario, wherein the borrower repays all the delinquent funds distributed over the remaining life of the loan;
   for the pre-foreclosure sale option the system calculates an estimated value of a property, a total debt of the loan, and net proceeds of a loan;
   for the deed in lieu of foreclosure option the system calculates an estimated value of a property, a total debt of the loan, a real estate owned debt, and the total savings.

2. The system of claim 1, wherein the information relating to a loan comprises loan data, property data, borrower data, and a score.

3. The system of claim 2, wherein the score represents a probability of default value, wherein higher scores indicate higher risks of default.

4. The system of claim 1, wherein the collection component uses a loan identifier to retrieve the information relating to the loan.

5. The system of claim 1, wherein the collection component prompts the user to enter additional information that is used by the processing component to evaluate each of the plurality of workout options.

6. The system of claim 1, wherein the predetermined values are breakpoints and thresholds identified by the processing component.

7. The system of claim 6, wherein the breakpoints and thresholds vary as economic changes occur.

8. The system of claim 1, wherein the at least one recommendation advises the user which of the plurality of workout options to implement.

9. The system of claim 1, wherein the processing component classifies each of the plurality of scenarios based on the assessed risk associated with each of the plurality of workout options into one of four classifications based on the assessed risk associated with each of the plurality of workout options and the applicability of the workout option with the financial information.

10. The system of claim 9, wherein the four classifications include a classification of recommended scenarios, a classification for cautionary scenarios, a classification for not recommended scenarios, and a classification for none applicable scenarios.

11. The system of claim 10, wherein the user is offered all scenarios for each workout option classified as a recommended scenario.

12. The system of claim 1, wherein the processing component evaluates the plurality of workout options to assess and classify multiple workout scenarios to assess the risks associated with each of the plurality of workout options and to provide at least one recommendation for each workout option to a user before displaying the results to the user.

13. The system of claim 12, wherein the processing component provides multiple recommendations, including at least one evaluated scenario for each workout option.

14. The system of claim 1, wherein the processing component provides a plurality of recommendation for at least one workout option after evaluating the plurality of workout options.

15. The system of claim 1, wherein the processing component simultaneously provides a plurality of recommendation for each workout option after evaluating the plurality of workout options.

16. The system of claim 1, wherein
for the repayment plan option the system if one of the four different repayment scenarios includes payments of more than an amount, determined by an income, less expenses, plus a predefined amount, then the repayment plan option is not recommended;
for the loan modification plan option the system if the repayment scenario includes a note rate and an income that is above a predefined threshold then the loan modification plan option is recommended;
for the pre-foreclosure sale option if the net proceeds is greater than the total debt then the pre-foreclosure sale option is not recommended, and if the net proceeds is equal to or greater than a predefined percentage of the total debt but less than the total debt then the pre-foreclosure sale option is recommended;
for the deed in lieu of foreclosure option if the net proceeds is greater than the total debt then deed in lieu of foreclosure option is not recommended.

17. A computer implemented method for evaluating a plurality of loan workout options by a workout system having access to a plurality of internal and external data sources, wherein at least one workout option includes a plurality of scenarios, the method comprises the steps of:
inputting a loan identifier into loan a workout system via a user interface;
using the loan identification information to retrieve information relating to the loan from the plurality of internal and external data sources;
identifying predefined values for each of the plurality of workout options based on empirical analysis of mortgage related data;
using, by the computer, the predefined values, the information relating to the loan, and predefined rules associated with each of the plurality of scenarios to evaluate at least one scenario associated with each of the plurality of workout options;
generating, by the computer, a recommendation for each of the plurality of workout options; and
presenting the recommendation for each of the plurality of workout options to a user;
wherein:
the workout options include a repayment plan option, a loan modification option, a pre-foreclosure sale option, an assumption of mortgage option, and a deed in lieu of foreclosure option;
for the repayment plan option the system produces four different repayment scenarios, wherein the borrower repays all the delinquent funds within a specified term by making larger than normal monthly payments;
for the loan modification plan option the system produces a repayment scenario, wherein the borrower repays all the delinquent funds distributed over the remaining life of the loan;
for the pre-foreclosure sale option the system calculates ma estimated value of a property, a total debt of the loan, and net proceeds of a loan;
for the deed in lieu of foreclosure option the system calculates an estimated value of a property, a total debt of the loan, a real estate owned debt, and the total savings.

18. A computer-readable medium whose contents cause a computer system to facilitate in evaluating a plurality of workout options, by performing the steps of:
inputting a loan identifier into loan a workout system;
using the loan identification information to retrieve information relating to the loan;
identifying predefined values for each of the plurality of workout options based on empirical analysis of mortgage related data;
using the predefined values, the information relating to the loan, and predefined rules associated with each of the plurality of scenarios to evaluate at least one scenario associated with each of the plurality of workout options;
generating a recommendation for each of the plurality of workout options; and
presenting the recommendation for each of the plurality of workout options to a user wherein:
the workout options include a repayment plan option, a loan modification option, a pre-foreclosure sale option, an assumption of mortgage option, and a deed in lieu of foreclosure option;
for the repayment plan option the system produces four different repayment scenarios, wherein the borrower repays all the delinquent funds within a specified term by making larger than normal monthly payments;
for the loan modification plan option the system produces a repayment scenario, wherein the borrower repays all the delinquent funds distributed over the remaining life of the loan;
for the pre-foreclosure sale option the system calculates an estimated value of a property, a total debt of the loan, and net proceeds of a loan;
for the deed in lieu of foreclosure option the system calculates an estimated value of a property, a total debt of the loan, a real estate owned debt, and the total savings.

* * * * *